(12) United States Patent
Foo

(10) Patent No.: US 9,037,459 B2
(45) Date of Patent: May 19, 2015

(54) SELECTION OF TEXT PREDICTION RESULTS BY AN ACCESSORY

(75) Inventor: Edwin W. Foo, San Mateo, CA (US)

(73) Assignee: Apple Inc., Cupertino, CA (US)

(*) Notice: Subject to any disclaimer, the term of this patent is extended or adjusted under 35 U.S.C. 154(b) by 1034 days.

(21) Appl. No.: 13/047,561

(22) Filed: Mar. 14, 2011

(65) Prior Publication Data

US 2012/0239395 A1    Sep. 20, 2012

(51) Int. Cl.
| | | |
|---|---|---|
| G10L 15/00 | (2013.01) | |
| G10L 21/00 | (2013.01) | |
| G10L 25/00 | (2013.01) | |
| G06F 3/02 | (2006.01) | |
| G06F 3/041 | (2006.01) | |
| G06F 3/045 | (2006.01) | |
| H04M 1/725 | (2006.01) | |
| G10L 15/26 | (2006.01) | |
| G06F 3/023 | (2006.01) | |
| G06F 3/0481 | (2013.01) | |

(52) U.S. Cl.
CPC .......... *H04M 1/72527* (2013.01); *G10L 15/26* (2013.01); *G06F 3/0227* (2013.01); *G06F 3/0237* (2013.01); *G06F 3/0481* (2013.01); *H04M 1/7253* (2013.01); *H04M 1/72552* (2013.01); *H04M 1/72588* (2013.01); *H04M 2250/70* (2013.01)

(58) Field of Classification Search
CPC ..... G10L 15/00; G10L 15/18; G10L 15/1815; G10L 15/19; G10L 15/20; G10L 15/26; G10L 15/265; G06F 3/00; G06F 3/02; G06F 3/0205; G06F 3/0219; G06F 3/0221; G06F 3/0231; G06F 3/0227; G06F 3/0203; G06F 3/0233; G06F 3/0489; G06F 3/04892; G06F 3/04895; G06F 3/04897; G06F 3/547; G06F 3/03549; G06F 3/033

USPC ............... 704/9, 231, 235, 275, 251, 270; 345/168–173; 341/22

See application file for complete search history.

(56) References Cited

U.S. PATENT DOCUMENTS

| | | | | |
|---|---|---|---|---|
| 7,129,932 | B1 * | 10/2006 | Klarlund et al. | ............... 345/168 |
| 7,200,555 | B1 * | 4/2007 | Ballard et al. | ................ 704/235 |
| 7,315,818 | B2 * | 1/2008 | Stevens et al. | ................ 704/235 |
| 7,319,957 | B2 * | 1/2008 | Robinson et al. | ............ 704/252 |
| 7,546,529 | B2 * | 6/2009 | Reynar et al. | ................. 715/256 |
| 7,630,980 | B2 * | 12/2009 | Parikh | .................................. 1/1 |

(Continued)

OTHER PUBLICATIONS

U.S. Appl. No. 61/302,935, filed Feb. 2010, Estes, Emily.*

(Continued)

*Primary Examiner* — Paras D Shah
(74) *Attorney, Agent, or Firm* — Brownstein Hyatt Farber Schreck, LLP

(57) ABSTRACT

A method for entering text in a text input field using a non-keyboard type accessory includes selecting a character for entry into the text field presented by a portable computing device. The portable computing device determines whether text suggestions are available based on the character. If text suggestions are available, the portable computing device can determine the text suggestions and send them to the accessory, which in turn can display the suggestions on a display. A user operating the accessory can select one of the text suggestions, expressly reject the text suggestions, or ignore the text suggestions. If a text suggestion is selected, the accessory can send the selected text to the portable computing device for populating the text field.

21 Claims, 9 Drawing Sheets

(56) References Cited

U.S. PATENT DOCUMENTS

| | | | |
|---|---|---|---|
| 7,884,804 B2 * | 2/2011 | Kong | 345/173 |
| 7,904,298 B2 * | 3/2011 | Rao | 704/270 |
| 8,688,698 B1 * | 4/2014 | Black et al. | 707/732 |
| 2003/0001820 A1 * | 1/2003 | Hou | 345/168 |
| 2003/0144830 A1 | 7/2003 | Williams | |
| 2004/0012558 A1 | 1/2004 | Kisuki et al. | |
| 2005/0149328 A1 * | 7/2005 | Huang et al. | 704/252 |
| 2005/0223308 A1 * | 10/2005 | Gunn et al. | 715/500 |
| 2006/0235684 A1 * | 10/2006 | Chang | 704/233 |
| 2006/0274051 A1 * | 12/2006 | Longe et al. | 345/173 |
| 2006/0293889 A1 * | 12/2006 | Kiss et al. | 704/235 |
| 2007/0130380 A1 * | 6/2007 | Tysowski | 710/15 |
| 2008/0310723 A1 * | 12/2008 | Manu et al. | 382/182 |
| 2009/0070109 A1 * | 3/2009 | Didcock et al. | 704/235 |
| 2009/0135029 A1 | 5/2009 | Ladouceur et al. | |
| 2009/0174667 A1 * | 7/2009 | Kocienda et al. | 345/169 |
| 2009/0192786 A1 * | 7/2009 | Assadollahi | 704/9 |
| 2009/0273566 A1 * | 11/2009 | Lu et al. | 345/169 |
| 2011/0087961 A1 * | 4/2011 | Fitusi et al. | 715/261 |
| 2011/0193866 A1 * | 8/2011 | Estes et al. | 345/467 |
| 2011/0202876 A1 * | 8/2011 | Badger et al. | 715/816 |

OTHER PUBLICATIONS

International Search Report and Written Opinion for Application No. PCT/US2012/028615 mailed on Jun. 21, 2012, 10 pages.

* cited by examiner

| Command | Payload |
|---|---|
| TextInputSuggestion | Text Suggestions |
| AcceptTextInputSuggesstion | Selected text suggestion |
| DeclineTextInputSuggesstion | None |
| CursorMove | Direction (UP, DOWN, LEFT, RIGHT) |
| CursorSelect | None |

Fig. 4

SELECTION OF TEXT PREDICTION RESULTS BY AN ACCESSORY

BACKGROUND

Consumers are increasingly demanding devices that can perform multiple tasks. Recent advancements in smart phones and other portable communication devices are geared towards making these devices as versatile as possible.

In many instances, these consumer devices have to work in conjunction with other devices to realize expanded functionalities. Such other devices are commonly referred to as accessories. An accessory usually performs some specialized function in conjunction with the consumer device. For example, a consumer device having text input capability can be connected to an external keyboard accessory for text input since the keyboard of the consumer device may not be easily operable, particularly by persons with disabilities or limited use of their hands. There are numerous accessories that are being sold in the market today for use with such consumer devices.

It is often difficult to enter text input using accessories that provide less user operable controls than an external keyboard, e.g., joysticks. Using such accessories in conjunction with an on-screen keyboard provided by the consumer device to enter text input can often be time consuming and frustrating for a user.

SUMMARY

Embodiments of the present invention generally relate to accessories for use with a portable computing device. More particularly, certain embodiments of the present invention provide a method for inputting text in a fast and efficient manner using accessories that have fewer controls for text inputs compared to a traditional keyboard.

In some embodiments, an accessory can be configured to work with a computing device. The accessory may include a display and one or more user controls such as buttons, track pads, or the like. When a user wishes to enter text in a text input field on a portable computing device, the user controls of the accessory can be manipulated to select one or more characters from an on-screen keyboard presented by the portable computing device. Once the user selects a character using the accessory, the portable computing device may provide one or more word suggestions based on the selected character. The one or more word suggestions may be sent to the accessory and displayed on the display of the accessory. The user may then select a word from the suggested words, ignore the suggestions and select the next character, or expressly reject the suggestions. If the user selects one of the suggested words, that word is sent to the portable computing device and subsequently displayed in the text field presented by the portable computing device.

Other embodiments of the present invention provide an accessory that can be configured to receive commands from the portable computing device that include the one or more word suggestions. During the authentication process, the accessory can inform the portable computing device that it is capable of receiving text suggestions, if available. For every text input field presented by the portable computing device, the portable computing device may determine whether a text prediction/suggestion feature is available for that text input field. If a text prediction/suggestion feature is available for a particular text field, the portable computing device can send a message to the accessory informing the accessory that a text prediction/suggestion feature is available whenever the accessory selects that text input field. Thereafter, once the user selects a character from, e.g., an on-screen keyboard presented on the portable computing device, the computing device can suggest one or more words based on the selected character and send a command to the accessory including the one or more words. The accessory can display the word suggestions received from the portable computing device and enable the user to select a word from the received words. Once the user selects a word, the accessory can send another command to the portable computing device including the selected word.

The following detailed description, together with the accompanying drawings will provide a better understanding of the nature and advantages of the present invention.

BRIEF DESCRIPTION OF THE DRAWINGS

FIG. 4 is a table illustrating some commands that can be exchanged between the accessory and the portable computing device according to an embodiment of the present invention.

DETAILED DESCRIPTION

Figure 1:
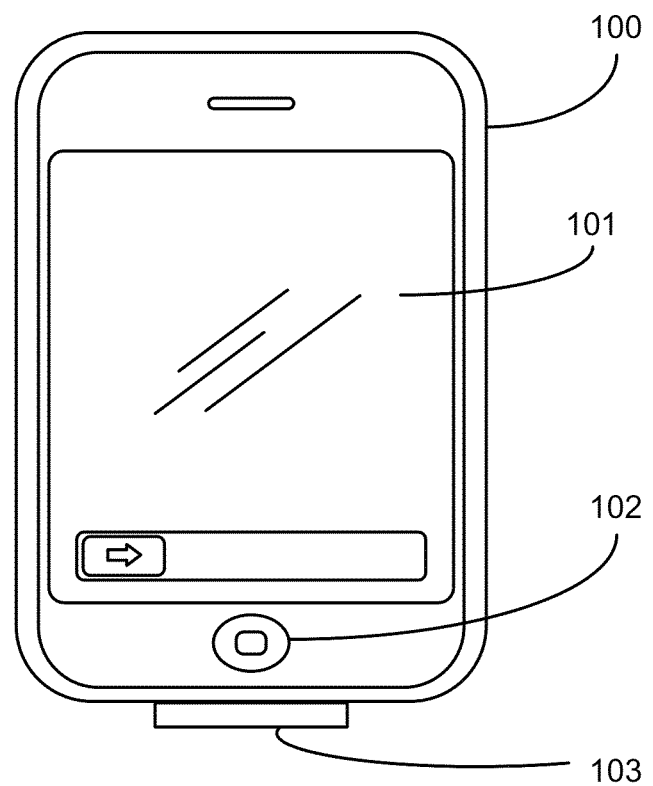
FIG. 1 illustrates a portable computing device (PCD).

Embodiments of the present invention generally relate to using an accessory to enter text on a portable computing device. More specifically, certain embodiments of the present inventions provide a method for entering text using an accessory other than a keyboard. Examples of such accessories can include joysticks, remote controls, and accessories with fewer controls for text input than a traditional keyboard.

Conventionally, there are two basic methods of entering text into a text input field. The first method includes using a traditional keyboard that can be coupled to a host device such as a computer, a portable computing device, or the like for inputting text. In the second method, the host device can display an on-screen keyboard. A user can navigate the on-screen keyboard one character at a time, using a non-keyboard type device, e.g., a mouse, to select a character for input into the text field. This method of text entry is cumbersome and time consuming, especially if a large amount of text is to be entered.

In instances where the user has certain disabilities that prevent the user from using a conventional keyboard, the process of text entry using the conventional processes described above can be especially challenging. It would be useful to facilitate entry of text by a person with disabilities.

Some embodiments of the present invention provide a method for entering text into a text field presented by a portable computing device. In the method, a portable computing device can send a message to an accessory when it presents a text field that needs to be populated. The message can include an indication as to whether a text prediction/suggestion feature is available for the text field. In some embodiments, the accessory can let the portable computing device know in advance, e.g., during authentication, whether it is capable of receiving text predictions/suggestions. Once the user enters a character or a sequence of few characters into the text field using the accessory, the portable computing device can determine one or more possible text suggestions, e.g., words, based on the entered characters. Thereafter, the portable computing device can send the one or more text suggestions to the accessory via a command. In some embodiments, the accessory may display the one or more text suggestions on a display associated with the accessory. The user can then select a text suggestion from the text suggestions. The accessory can then send the selected text suggestion to the portable computing device for populating into the text field.

In some embodiments, instead of displaying the suggested text, the accessory may audibilize the received text suggestions. The user may hear the text suggestions, select a text suggestion from the text suggestions, and speak back the selected text suggestion into the accessory. The accessory may then convert the spoken text suggestion into corresponding text and send it to the portable computing device for populating the text field.

In still other embodiments, the user may choose to ignore the text suggestions. In this instance, the user can either continue entering the next character of the intended word or expressly reject the text suggestions and send an indication to that effect to the portable computing device. When a user rejects the text suggestions received from the portable computing device and instead enters a different word, the portable computing device can use this input as part of a learning process to better predict/suggest text in the future. Over time, the portable computing device can be customized for a particular user based on historical data collected from entries into various text fields.

FIG. 1 illustrates a portable computing device (PCD) 100 according to an embodiment of the present invention. PCD 100 can include a screen 101, a button 102, and a connector 103, among other features. The screen 101 can be a touch screen that includes a tactile interface. A user can interact with PCD 100 via a user interface (not shown) and screen 101. Button 102 can be used to return PCD 100 to its "home" state. Connector 103 can be a multi-pin connector capable of connecting to external devices/accessories, e.g., a charger, a dock, etc. In some embodiments, connector 103 can be configured to mate with a corresponding connector on an accessory. In some embodiments, PCD 100 can include a laptop computer, a smart phone, a personal media player, a portable digital assistant, and the like.

Figure 2:
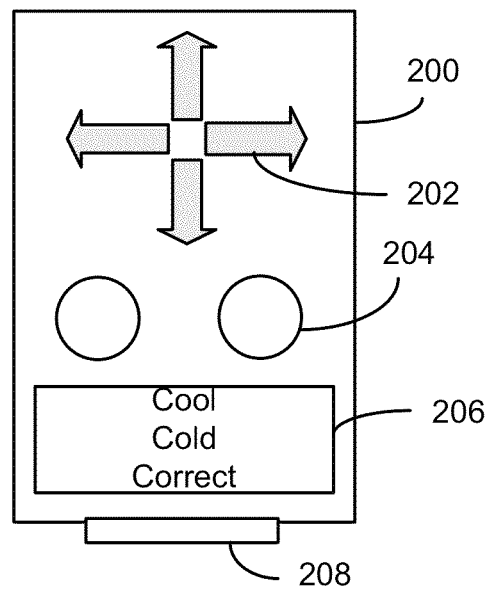
FIG. 2 illustrates an accessory according to an embodiment of the present invention.

FIG. 2 illustrates an accessory 200 according to an embodiment of the present invention. Accessory 200 can include user operable control inputs 202 and 204, a display 206, and a connector 208. User operable controls 202 and 204 can be used to manipulate position of a cursor that can be displayed on PCD 100. User operable controls 202 may allow the cursor to be moved horizontally and vertically to position the cursor at any particular location on display 101. In some embodiments, user controls 202 may also be used to navigate the contents displayed on screen 206. User controls 204 can be buttons that can be used to select a particular item either on PCD 100 or on accessory 200. Display 206 can display information such as word suggestions received from the portable computing device. Connector 208 can be a multi-pin connector capable of connecting to external devices, e.g., another accessory, etc. In some embodiments, connector 208 can be configured to mate with a corresponding connector on a portable computing device. Accessory 200 can be any accessory that has functionality for inputting text into an external system coupled to it.

Figure 3:
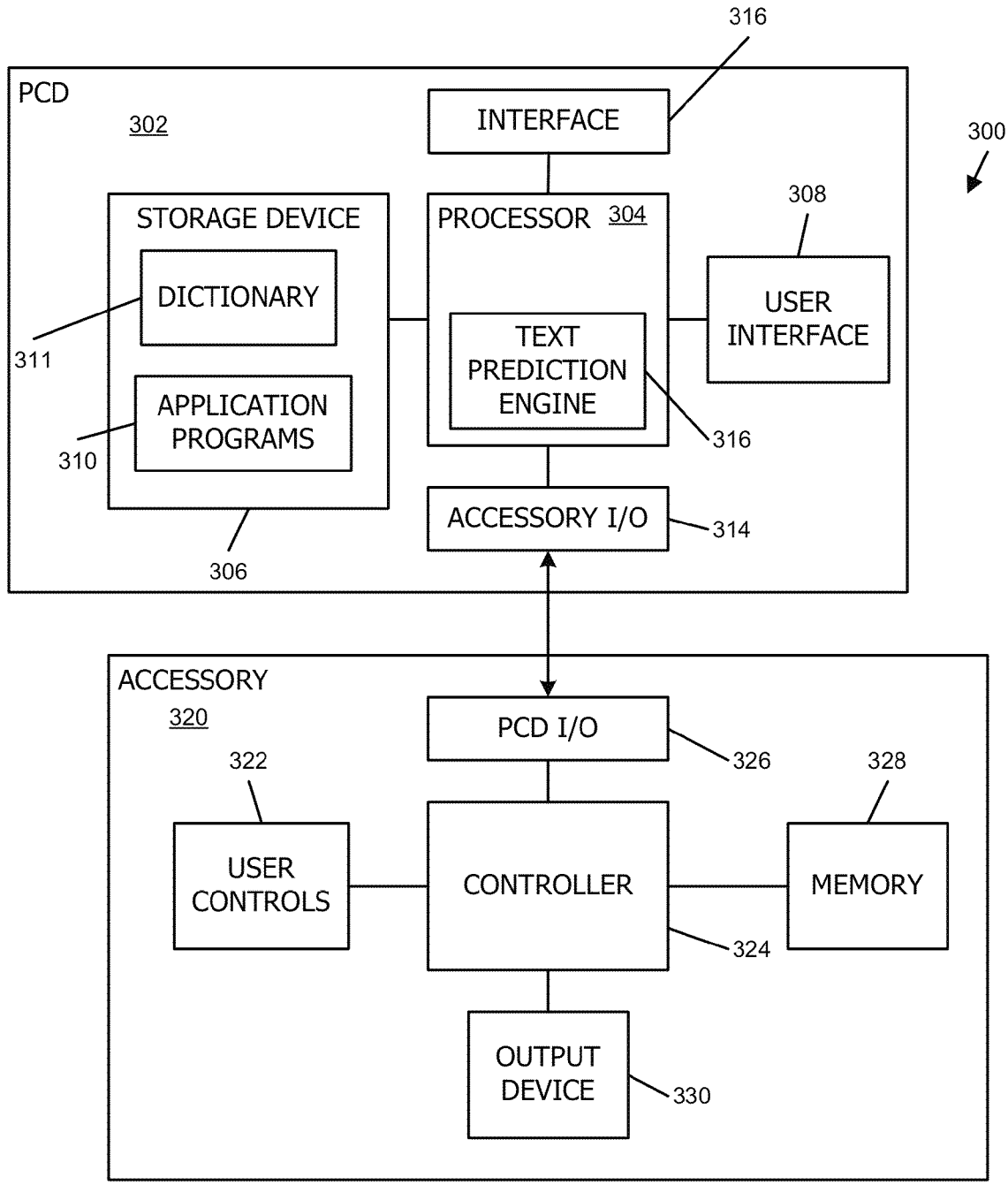
FIG. 3 illustrates a block diagram of system according to an embodiment of the present invention.

FIG. 3 is a block diagram of system 300 according to an embodiment of the present invention. System 300 can include PCD 302 (e.g., implementing PCD 100 of FIG. 1) and an accessory 320 (e.g., implementing accessory 200 of FIG. 2).

PCD 302 in this embodiment can provide a text input field that can be associated with an application or otherwise. For example, the text input field may be part of a website being viewed by a user or part of a word processing application resident on PCD 302. PCD 302 can include processor 304, storage device 306, user interface 308, and accessory input/output (I/O) interface 314. PCD 302 can execute text-prediction programs that analyze a character entered into a text field along with zero or more characters/words entered prior to that character, and determine one or more potential words based on that analysis.

Storage device 306 can be implemented, e.g., using disk, flash memory, or any other non-volatile storage medium. In some embodiments, storage device 306 can store a word dictionary 311 that can be used by PCD 302 to predict/suggest words. Storage device 306 can also store one or more application programs 310. Each application program can provide functionality for performing one or more tasks. For example, an application program can provide word processing capability, another application may provide the ability to browse the Internet, etc. One or more of application programs 310 may present a text field that can be populated with text received from the user via user interface 308 or an accessory.

Storage device 306 can also store other information such as information about a user's contacts (names, addresses, phone numbers, etc.); scheduled appointments and events; notes; and/or other personal information. In still other embodiments, storage device 306 can store one or more programs to be executed by processor 304 (e.g., video game programs, personal information management programs, etc.).

User interface 308 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 308 to invoke the functionality of PCD 302 and can view and/or hear output from PCD 302 via user interface 308.

Processor 304, which can be implemented as one or more integrated circuits (e.g., a conventional microprocessor or microcontroller), can control the operation of PCD 302. For example, in response to character input received via user interface 308 or an accessory, processor 304 can navigate dictionary 311 stored in storage device 306 in response to the character input and can determine one or more possible words based on the received characters. Processor 304 can execute application programs 310 stored in storage device 306 and present the results of the execution to the user via user interface 308. In some embodiments, processor 302 can include a text prediction engine 316. Text prediction engine 316 can analyze the most recently entered character in a text field and determine one or more text suggestions based on that character. In some embodiments, in addition to the most recently entered character, prediction engine 316 may also analyze one or more characters and/or text entered prior to the most recently entered character to determine the context of a sentence or partial word and determine one or more potential text suggestions based on the most recently entered character and the context. In some embodiments, if the accessory rejects the suggested text/words, prediction engine 316 can "learn" from the rejection and use that information to refine its analysis.

Accessory I/O interface 314 can allow PCD 302 to communicate with various accessories. For example, accessory I/O interface 314 might support connections to a joystick, a remote control, or the like. In one embodiment, accessory I/O interface 314 includes a 30-pin connector corresponding to the connector used on iPod® products manufactured and sold by Apple Inc. Alternatively or additionally, accessory I/O interface 314 can include a different connector and/or wireless interface (e.g., Bluetooth or the like).

Interface 316 can allow PCD 302 to communicate with other devices on a network and exchange information with the other devices. For example, in some embodiments, network interface 316 can be used to connect with an external database in order to determine potential text suggestions. In some embodiments, dictionary 311 can be synchronized periodically with the external database to ensure that dictionary 311 always includes the most current information. In some embodiments interface 316 can include radio frequency (RF) transceiver components for accessing wireless voice and/or data networks (e.g., using cellular telephone technology, advanced data network technology such as 3G, 4G, or EDGE, Wi-Fi (IEEE 802.11 family standards), or other mobile communication technologies, or any combination thereof), GPS receiver components, and/or other components. In some embodiments interface 316 can provide wired network connectivity (e.g., Ethernet) in addition to or instead of a wireless interface. Interface 316 can be implemented using a combination of hardware (e.g., antennas, modulators/demodulators, encoders/decoders, and other analog and/or digital signal processing circuits) and software components.

Accessory 320 includes controller 324, user controls 322, PCD I/O interface 326, memory 328, and output device 330. Controller 324 can include, e.g., a microprocessor or microcontroller executing program code to perform various functions such as digital audio decoding, analog or digital audio and/or video processing, and the like. User controls 322 can include input controls such as a touch pad, touch screen, scroll wheel, click wheel, dial, button, keypad, microphone, joystick, buttons, or the like. A user can operate user controls 322 to invoke the functionality of accessory 320. In addition, in some embodiments, a user can operate PCD 302 via user controls 322. In some embodiments, user controls 322 can be located remote to the accessory. For instance, user controls 322 can be implemented in a remote control device (not shown) that is communicably coupled to accessory 320 and that can be used to control the various functions performed by accessory 320. PCD I/O interface 326 can allow accessory 320 to communicate with PCD 302 (or another PCD).

Memory 328, which can be implemented using volatile and/or nonvolatile memory, provides storage for various information including information obtained from PCD 302. For example, in some embodiments, accessory 320 can receive a list of potential text suggestions from PCD 302. Any or all of this information can be stored in memory 328. Caching of information obtained from PCD 302 by accessory 320 is optional; where used, caching can help speed up performance of accessory 320 by avoiding repeated requests for information from PCD 302.

Output device 330, which can be implemented, e.g., as one or more integrated circuits, provides the capability to output various types of information. For example, output device 330 can include a display screen or a driver circuit and connector for an external display screen, thereby enabling text, video, and/or still images to be presented to a user. Additionally or instead, output device 330 can also include one or more speakers or driver circuits and connectors for external speakers, thereby enabling audio to be presented to a user. In one embodiment, controller 324 can receive one or more text suggestions from PCD 302 via PCD I/O interface 326 and can provide the text suggestions with or without further processing to output device 330; output device 330 can transform the received text suggestions as appropriate for presentation to the user. In some embodiments, a user can view and/or hear output from accessory 320 via output device 330.

Accessory 320 can be any accessory capable of providing user controls for selecting characters on PCD 302 and presenting a list of words received from PCD 302 to a user. Examples of accessories implementing accessory 320 include, e.g., a joystick, a remote control, or the like. In one embodiment, PCD I/O interface 326 includes a 30-pin connector that mates with the connector used on iPod® and iPhone™ products manufactured and sold by Apple Inc. PCD I/O interface 326 can also include other types of connectors, e.g., Universal Serial Bus (USB) or FireWire connectors, and/or a wireless interface (e.g., Bluetooth or the like).

It will be appreciated that the system configurations and components described herein are illustrative and that variations and modifications are possible. The PCD and/or accessory can have other capabilities not specifically described herein.

Further, while the PCD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Accessory I/O interface 314 of PCD 302 and PCD I/O interface 326 of accessory 320 allow PCD 302 to be connected to accessory 320 and subsequently disconnected from accessory 320. As used herein, PCD 302 and accessory 320 are "connected" whenever a communication channel between accessory I/O interface 314 and PCD I/O interface 326 is open and are "disconnected" whenever the communication channel is closed. Connection can be achieved by physical attachment (e.g., between respective mating connectors of PCD 302 and accessory 320), by an indirect connection such as a cable, or by establishing a wireless communication channel. Similarly, disconnection can be achieved by physical detachment, disconnecting a cable, powering down accessory 320 or PCD 302, or closing the wireless communication channel. Thus, a variety of communication channels can be used, including wired channels such as USB, FireWire, or universal asynchronous receiver/transmitter ("UART"), or wireless channels such as Bluetooth. In some embodiments, multiple communication channels between a computing device and an accessory can be open concurrently, or a computing device can be connected to multiple accessories, with each accessory using a different communication channel.

Regardless of the particular communication channel, as long as PCD 302 and accessory 320 are connected to each other, the devices can communicate by exchanging commands and data according to a protocol. The protocol defines a format for sending messages between PCD 302 and accessory 320. For instance, the protocol can specify that each message is sent in a packet with a header and an optional payload. The header provides basic information (e.g., a start indicator, length of the packet, and a command to be processed by the recipient), while the payload provides any data associated with the command; the amount of associated data can be different for different commands, and some commands can provide for variable-length payloads. In various embodiments, the protocol can define specific commands to indicate an action to be taken by the recipient; to signal completion of a task, change of state, or occurrence of an error; and/or to identify the nature of the associated data. In some embodiments, the commands can be defined such that a particular command is valid in only one direction. The packet can also include error-detection or error-correction codes as known in the art.

In some embodiments, every accessory 320 and every PCD 302 that are designed to be interoperable with each other support at least a "general" lingo that includes commands common to all such devices. The general lingo can include commands enabling the PCD and the accessory to identify themselves to each other and to provide general information about their respective capabilities. The general lingo can also include authentication commands that the PCD can use to verify the purported identity and capabilities of the accessory (or vice versa), and the accessory (or PCD) can be blocked from invoking certain commands or lingoes if the authentication is unsuccessful.

During the identification process, the accessory can inform the PCD that it can accept word suggestions for a text field, e.g., using a command in the general lingo. If the accessory is capable of accepting text suggestions, then the PCD can turn on this feature so that every time a text field is encountered on the PCD, it can send a notification to the accessory informing the accessory that a text prediction/suggestion feature is available for that text input field.

FIG. 4 illustrates a table 400 listing commands that can be exchanged between the host device and the accessory according to an embodiment of the present invention. These commands can be incorporated into remote lingo (or other group of commands), thereby allowing the accessory to notify the host device that it is capable of accepting text suggestions and for the host device to send text suggestions to the accessory.

A TextInputSuggestion command can be sent by the PCD to the accessory. The payload can include one or more text suggestions that are determined by the PCD based on the last character and/or recent characters entered in the text field.

The accessory can respond with a AcceptTextInputSuggesstion command or a Decline TextInputSuggestion command. The payload for the AcceptTextInputSuggesstion command can include a text suggestion selected by the accessory from the one or more text suggestions received via the TextInputSuggestion command. In some embodiments, where the TextInputSuggestion command includes a single text suggestion, the AcceptTextInputSuggesstion command may not have a payload at all. In this instance, merely sending the AcceptTextInputSuggesstion command can act as acceptance of the single text suggestion received via the TextInputSuggestion command.

The Decline TextInputSuggestion command can be sent by the accessory to the PMD as an alternative response to the TextInputSuggestion command. The Decline TextInputSuggestion command may not have any payload. By sending this command, the accessory can expressly reject the text suggestions provided by the PCD.

In some embodiments, the accessory may send neither the AcceptTextInputSuggesstion command nor the Decline TextInputSuggestion command in response to the TextInputSuggestion command. Instead, the accessory may send a signal to the PCD indicating selection of the next character for populating the text field. This response can act as a de-facto rejection of the text suggestions provided by the PCD. In some embodiments, the main difference between this response and sending the Decline TextInputSuggestion command is that sending the Decline TextInputSuggestion command informs the PCD that the text suggestions were incorrect, as opposed to merely being ignored by the user. The PCD can use this information to refine its prediction engine in order to provide more relevant predictions in the future.

The CursorMove command can be sent by the accessory to the PMD in order to mover the cursor along an on-screen keyboard displayed on the PMD. The payload of the CursorMove command can be direction of the movement. For example, the cursor can be moved UP, DOWN, LEFT, or RIGHT for its current position. In some embodiments, the CursorMove command can be used to place the cursor over a desired character on the on-screen keyboard.

The CursorSelect command can be sent by the accessory to the PMD for selecting a character on the on screen keyboard. For example, after the cursor is placed over a character using the CursorMove command, the accessory can send the CursorSelect command to select the character. In some embodiments, the CursorSelect command may not have any payload. By sending the CursorSelect command the accessory informs the PMD to select the character pointed to / highlighted by the cursor. The character selection commands described above can be communicated using the same protocol / interface as that used for communicating the text suggestion commands. Further, it is to be understood that the CursorMove command and the CursorSelect command are exemplary and one skilled in the art will realize that many other commands/techniques for moving the cursor and selecting a character can be used. For example, In some embodiments, the user may speak a character into the accessory. The accessory can analyze the user's audio input and determine the character. The accessory can then send a command to the PMD, e.g., InputCharacter command, with the character as the payload for the command.

It will be appreciated that the commands described herein are illustrative and that variations and modifications are possible. In addition, other commands can also be provided. In some embodiments, the accessory can send a command to the PCD during the identification or authentication process to indicate to the PCD that the accessory is capable of accepting text suggestions if they are available. In response to that, the PCD may set a configuration flag (or turn on this feature) to enable sending of text suggestions to the accessory. The default option for the PCD can be to turn this feature off.

Figure 5:
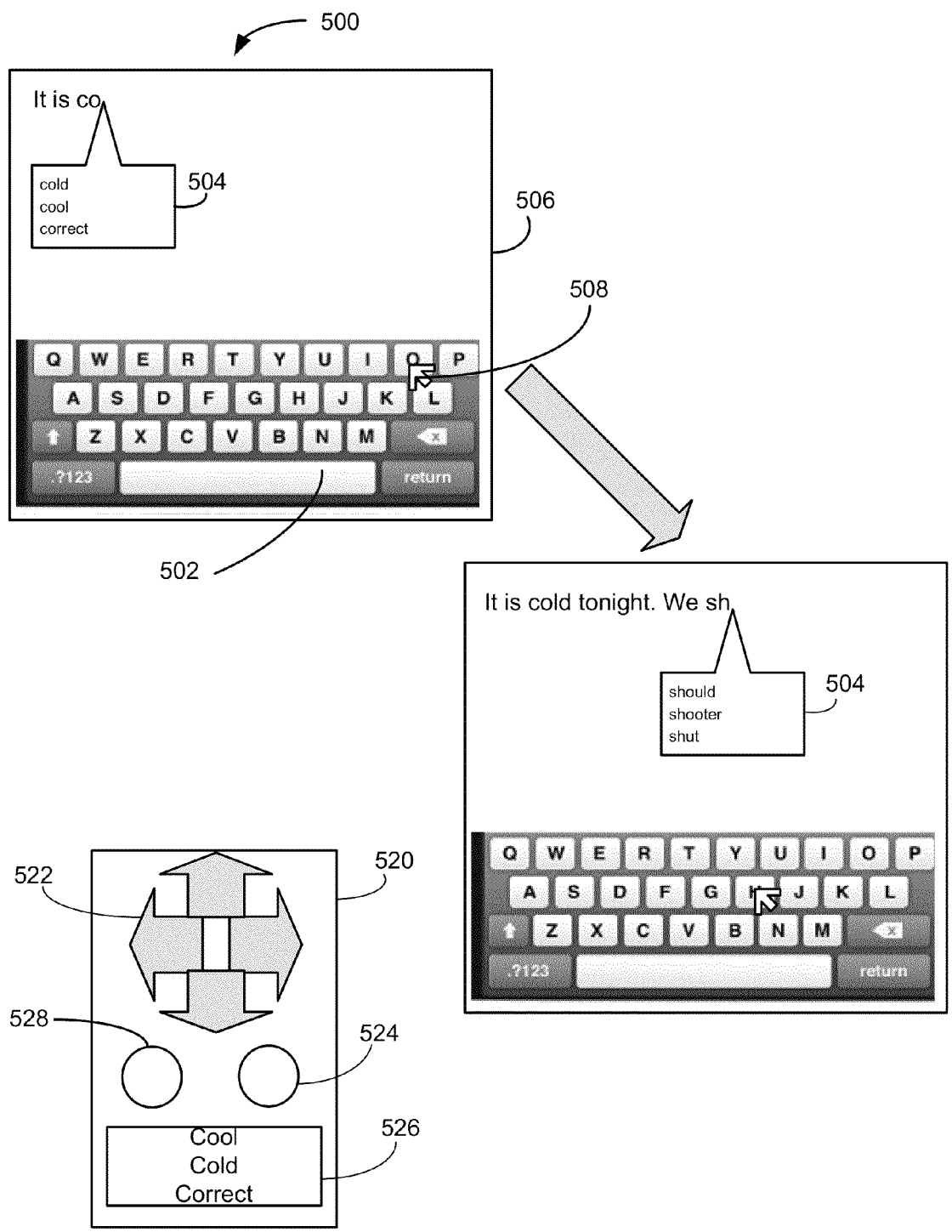
FIG. 5 is a functional diagram illustrating operation of a PCD and an accessory according to an embodiment of the present invention.

As described above, certain embodiments of the present invention provide methods for entering text using an accessory that does not have the functionality provided by a regular keyboard. FIG. 5 is a functional diagram illustrating a text prediction/suggestion feature according to an embodiment of the present invention.

FIG. 5 illustrates a PCD 500 (similar to PCD 100 of FIG. 1) and an accessory 520 (similar to accessory 200 of FIG. 2). FIG. 5 illustrates text being written and displayed on display 506 of PCD 500. In an embodiment, a user may manipulate directional controls 522 of accessory 520 to position the cursor 508 over a character on the on-screen keyboard 502 of PCD 500. After the user positions cursor 508, the user may press a button 524 on accessory 520 to select the character. Once selected, the character can then be displayed on display 506 of PCD 500. When PCD 500 determines that there are text suggestions available based on the last entered character or sequence of characters, PCD 500 may generate a text prediction box 504 and display it on display 506. Text prediction box 504 may include the one or more text predictions/ suggestions. Concurrently, PCD 500 may send the one or more text predictions/suggestions to accessory 520, e.g., using the TextInputSuggestion command.

Accessory 520 may display the received text suggestions on display 526 associated with accessory 520. At this point, accessory 520 may change its mode of operation and instead of continuing further text entry in the text field on PCD 500, accessory 520 may allow the user to select one of the received text suggestions. In some embodiments, the user may use user controls 522 to navigate the list displayed in display 526 and press button 524 to select one of the text suggestions. The selected text suggestion can be sent to PCD 500, e.g., using the AcceptTextInputSuggesstion command. The selected text/word can then be displayed on display 506. Thereafter, accessory 520 can change its mode again to allow selection of characters from on-screen keyboard 502.

If the user wants to ignore the text suggestions received from PCD 500, the user can press button 528 or any other button designated for this purpose on the accessory. Pressing button 528 can revert the accessory back to continuing text entry into the text field by selecting another character from on-screen keyboard 502. In some embodiments, the user can also use one of the buttons 524 or 528 or any other button/mechanism designated by the accessory manufacturer to expressly reject text suggestion received from PCD 500. In some embodiments, if the text suggestions are listed vertically on display 526, pressing the left or right controls 522 can signal that the user wants to ignore the text suggestions.

It is to be understood, that the illustration provided in FIG. 5 describes manipulating user controls on an accessory to select characters from an on-screen keyboard and to select a text suggestion provided by the PCD. In some embodiments, the user may input the characters into the PCD via an audio input device coupled to the PCD. Once the PCD receives the audio input, it can convert the audio into text and display the character on its display. Based on the character, the PCD can determine one or more text suggestions and provide them to the accessory. The accessory may audibilize the received text suggestions for presentation to the user. The user may accept, deny, or ignore the text suggestions by providing an audio input to the accessory, which in turn can interpret the audio input and send an appropriate command to the PCD. In some embodiments, instead of providing audio input to the PCD to select a character, the user may provide audio input to the accessory, which may interpret the audio and send a command selecting the appropriate character to be displayed on the display.

In some embodiments, the user can speak an entire word or part of a word. The PCD can receive this audio input and determine the word spoken by the user based on the received audio information. Based on the determination, the PCD can determine one or more text suggestions and send those to the accessory. The user can then accept, decline, or ignore the text suggestions using any of the techniques described above.

Figure 6A:
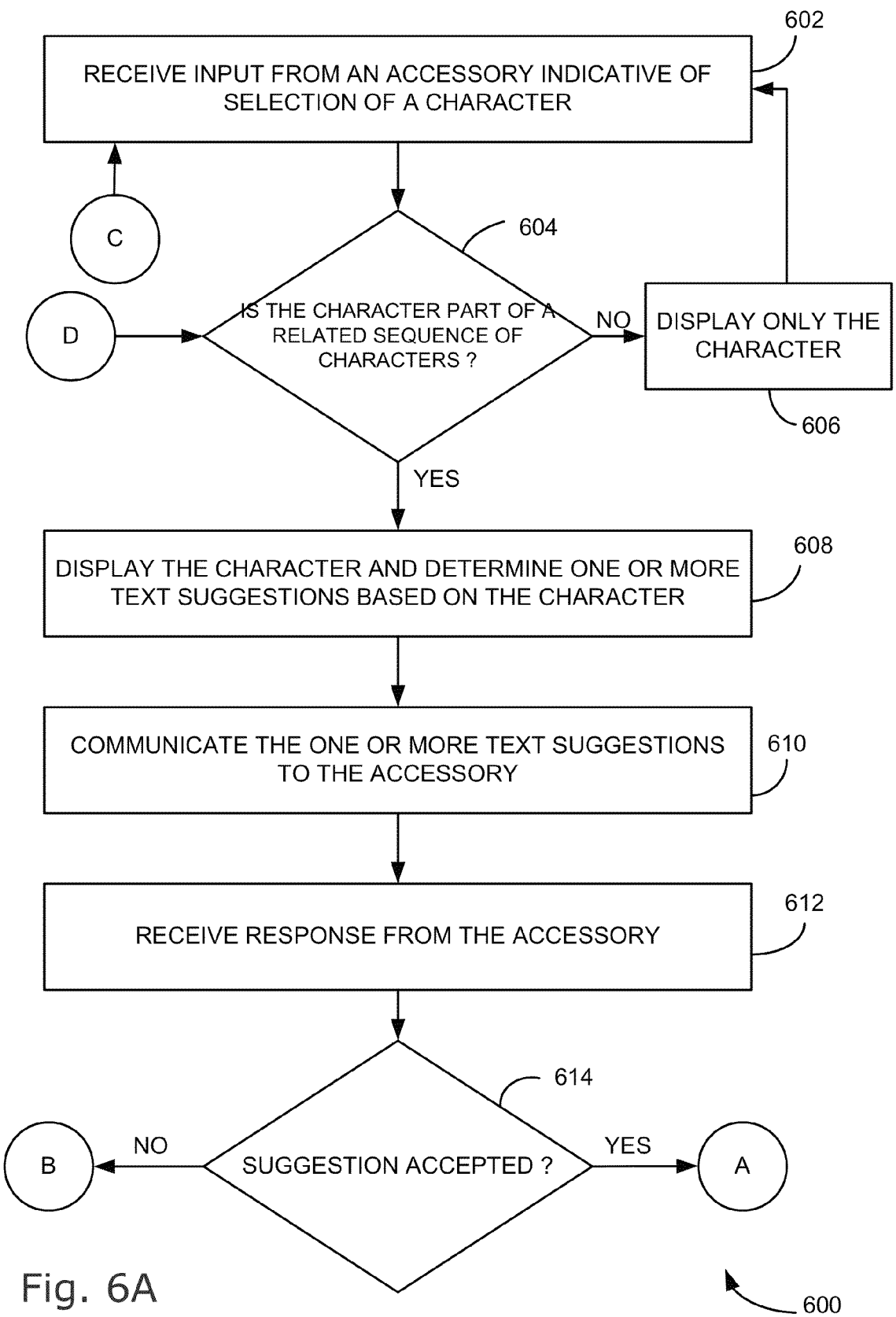
FIGS. 6A-6C is a flow diagram of a process for predicting text according to an embodiment of the present invention.
Figure 6B:
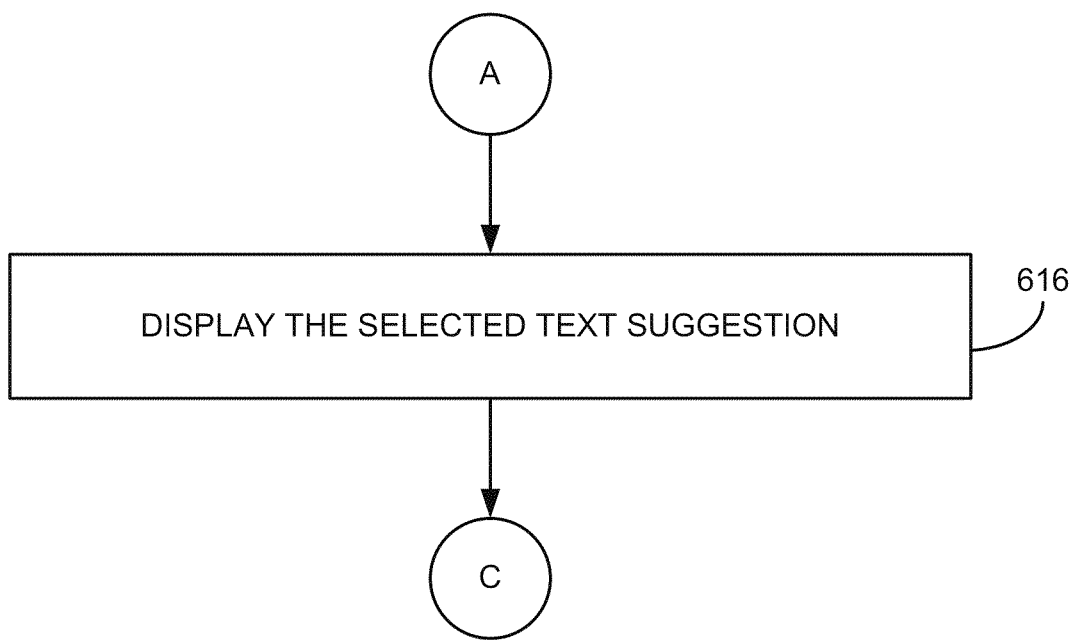
Figure 6C:
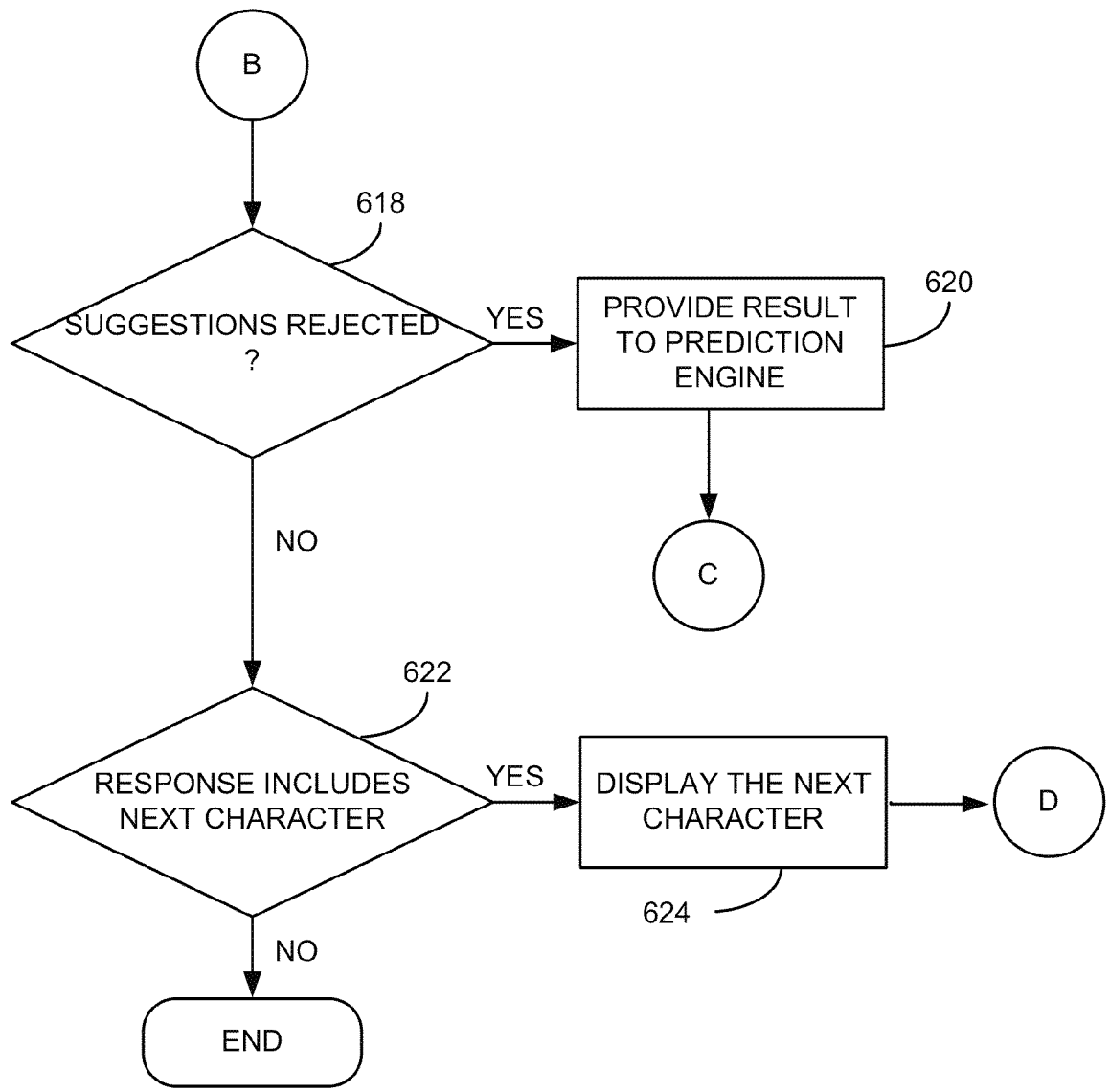

As discussed above, the PCD can receive a character input and determine one or more words based on that character or a sequence of characters entered prior to that character. FIGS. 6A-6C are a flow diagram of a process 600 for predicting text according to an embodiment of the present invention. Process 600 can be performed by e.g., PCD 200 of FIG. 2.

As part of process 600, the PCD can receive an input from the accessory indicating that a character has been selected for populating the currently active text input field (block 602). The PCD can determine whether the selected character is part of a related sequence of characters, e.g., a word, or a standalone character (block 604). In some embodiments, the prediction engine of the PCD can make this determination. In some embodiments, the prediction engine can determine the context of the sentence based on characters or sequence of characters entered previous to the current character to determine whether the currently entered character is a stand-alone character or part of word. If it is determined that the character is a standalone character and not part of a word, then only the character is displayed by the PCD (block 606) and the process returns to block 602. If the PCD determines that the character is part of a related sequence of characters, then the PCD can determine one or more text suggestions, e.g., words, based on the character or a sequence of characters entered prior to the character (block 608). Existing algorithms for predicting text based on a character or sequence of characters can be used to determine the text suggestions. Once determined, the one or more text suggestions can be communicated to the accessory (block 610). Thereafter, the PCD can receive an input from the accessory (block 612). As described above, the input from the accessory can include one of three responses: (a) the accessory accepts a text suggestion from the received text suggestion and sends the selected text suggestions to the PCD; (b) the accessory expressly rejects the text suggestions; or (c) the accessory merely ignores the text suggestions and selects the next character for the text field. Accordingly, after the PCD receives a response from the accessory, the PCD may determine whether the response indicates that the user has accepted one of the text suggestions and if so, whether the response includes the selected text suggestion (block 614). As shown in FIG. 6B, if the response from the accessory includes one of the text suggestions, the PCD can display the selected text suggestion (block 616) and the process returns to block 602.

As shown in FIG. 6C, if the response from the accessory does not include a text suggestion from the one or more text suggestions, the PCD can determine whether the response from the accessory indicates that the user has rejected the suggestions (block 618). If the response from the accessory indicates rejection of the text suggestions, the PCD can provide this information to the text prediction engine for future use (block 620). If it is determined that the user has not expressly rejected the text suggestion, the PCD can determine whether the response received from the accessory includes another character (block 622) and if so, the character is displayed on the PCD (block 624) and process returns to block 604.

It will be appreciated that process 600 described herein is illustrative and that variations and modifications are possible. Acts described as sequential can be executed in parallel, order of acts can be varied, and acts can be modified or combined. For instance, prior to receiving a character selection from the accessory, the PCD can inform the accessory that a text prediction feature is available for the particular text input field. This can enable the accessory to expect text suggestions and thereby adjust its mode of operation.

Figure 7A:
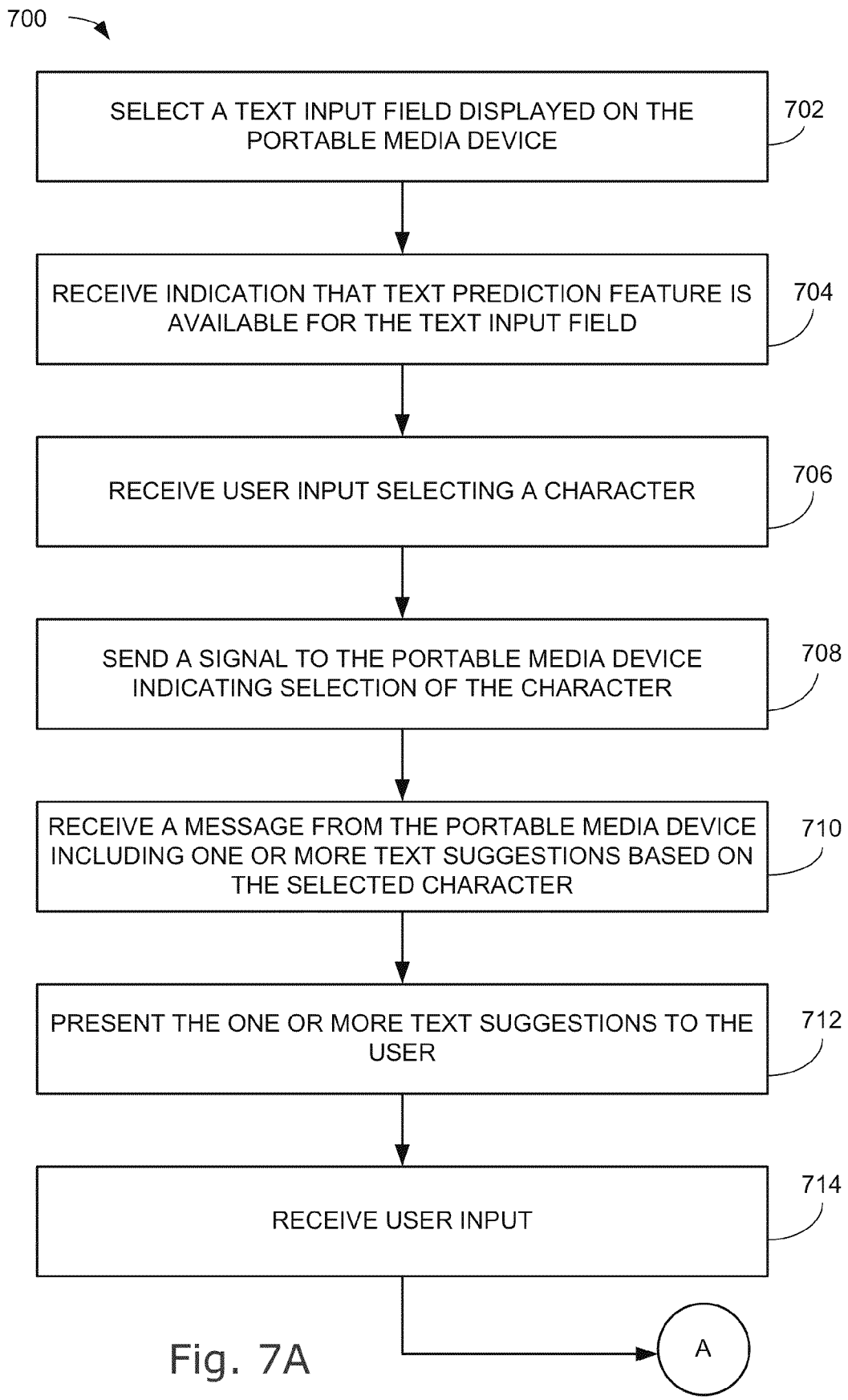
FIGS. 7A and 7B is a flow diagram of a process for inputting text using an accessory according to an embodiment of the present invention.
Figure 7B:
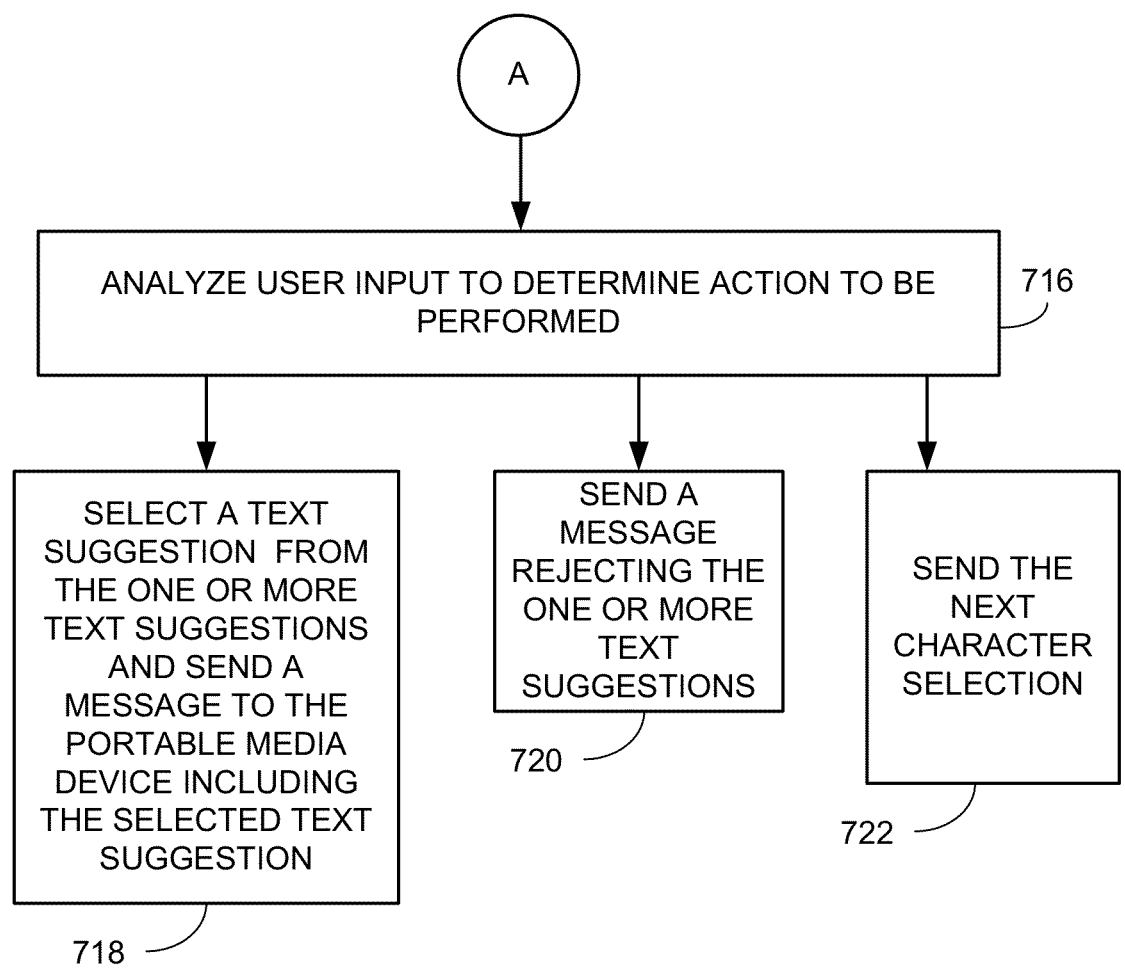

FIGS. 7A and 7B are a flow diagram of a process 700 for inputting text using an accessory according to an embodiment of the present invention. Process 700 can be performed, e.g., by accessory 320 of FIG. 3.

The user using the user controls of the accessory can send a message to the PCD indicating selection of a text input field presented by the PCD (block 702). Thereafter, the accessory can receive a message from the PCD indicating that a text prediction/suggestion feature is available for the text field (block 704). The accessory can then receive an user input indicating selection of character to be inputted in the text input field (block 706). The accessory can then send a signal to the PCD indicating selection of a character for populating the text field (block 708). Next, the accessory can receive a message from the PCD including one or more text suggestions, e.g., words or related sequence of characters, based on the selected character (block 710). Once the accessory receives the text suggestions, it can present the received text suggestions to the user, e.g., on a display (block 712). Thereafter the accessory can receive user input (block 714).

As shown in FIG. 7B, the accessory can analyze the user input to determine an action to be performed (block 716). In some embodiments, the accessory can perform one of three actions. The accessory can select one of the text suggestion from the received text suggestions and send the selected text suggestion to the PCD (block 718). Alternatively, the accessory can send a message to the PCD rejecting the text suggestions (720) followed by a signal indicating selection of a next character or the accessory can ignore the text suggestions and instead send a signal indicating selection of a next character for input into the text field (722). It is to be understood, the three options illustrated in FIG. 7 are not the only options available to the accessory. The accessory is not limited to the three illustrated responses and one skilled in the art will realize that the accessory may be programmed to perform other actions subsequent to receiving the message at block 710. For example, in some embodiments, the accessory can audibilize the received text suggestions in response to the received message that includes the text suggestions.

It will be appreciated that process 700 described herein is illustrative and that variations and modifications are possible. Acts described as sequential can be executed in parallel, order of acts can be varied, and acts can be modified or combined. For instance, after receiving the text suggestions, the accessory may display the text suggestions on a display associated with the accessory. In some embodiments, once the accessory receives the text suggestions, the accessory may change its mode of operation such that the accessory may disable sending a signal to the PCD indicating selection of the next character. Instead, the accessory may only allow the user to navigate the received text suggestions, e.g., using the user controls of the accessory, and perform an action on the received text suggestions, e.g., accept or deny. Once the user has performed an action on the received text suggestions, the accessory may revert back to its previous mode of operation and allow selection of the next character, e.g., from an on-screen keyboard of the PCD.

While the invention has been described with respect to specific embodiments, those skilled in the art will recognize that numerous modifications are possible. For instance, the accessory may inform the PCD about its capabilities in response to query from the PCD during the authentication process. In some embodiments, the accessory may inform the PCD that the accessory is capable of accepting text suggestions, if available. The particular commands and sequences of events described herein are illustrative and other combinations of commands and sequences of events can be used.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for using an accessory communicably coupled to a portable computing device, the method comprising, by the accessory:
   communicating, to the portable computing device, a first signal indicating selection of a text input field;
   receiving, from the portable computing device, indication that a text prediction feature is available for the text input field;
   sending, to the portable computing device, a second signal indicating selection of a character for the text input field;
   receiving, from the portable computing device, one or more text suggestions selected based at least in part on the selected character; and
   providing an instruction corresponding to an action to be performed, wherein the action is determined from a plurality of actions based on a user input at the accessory, the plurality of actions comprising:
     sending, to the portable computing device, a third signal indicating selection of a text suggestion from the one or more received text suggestions;
     sending, to the portable computing device, a fourth signal indicating rejection of the one or more received text suggestions and a fifth signal indicating selection of a next character, wherein the portable computing device provides the fourth signal to a text prediction engine; and
     sending, to the portable computing device, a sixth signal indicating selection of a character for the text input field without sending a signal indicating rejection of the received text suggestions.

2. The method of claim 1 further comprising displaying the one or more received text suggestions on a display of the accessory.

3. The method of claim 1 further comprising:
   subsequently to receiving the one or more text suggestions, changing an operation mode to allow selection of the text suggestion from the one or more text suggestions.

4. The method of claim 1 further comprising audibilizing the one or more received text suggestions using an audio output unit.

5. The method of claim 1 further comprising presenting the one or more received text suggestions on a user output device; and
   receiving, via an input device, a user input indicative of selection of the text suggestion from the one or more received text suggestions, wherein the third signal is based at least in part on the received user input.

6. The method of claim 5 wherein the input device comprises a speech recognition module.

7. The method of claim 1 wherein the one or more text suggestions comprise words.

8. A method for using a portable computing device communicably coupled with an accessory, the method comprising, by the portable computing device:
   receiving a first input from the accessory indicative of selection of a text input field;

receiving a second input from the accessory indicating selection of a character;
analyzing the character to determine whether the character is part of a word;
determining one or more suggested words based on the character if the character is part of a word;
communicating the one or more suggested words to the accessory;
receiving an indication from the accessory corresponding to an action to be performed, wherein the action is determined from a plurality of actions based on a user input at the accessory, the plurality of actions comprising:
  populating the text input field with a selected word upon receiving a third signal from the accessory indicating selection of the word;
  determining that the accessory expressly rejected each of the one or more suggested words upon receiving a fourth signal indicating a rejection of the one or more suggested words from the accessory followed by a fifth signal indicating entry of a next character, wherein the portable computing device provides the fourth signal to a text prediction engine; and
  determining that the accessory ignored each of the one or more suggested words upon receiving a sixth signal indicating selection of a character for the text input field without receiving a signal indicating a rejection of the one or more suggested words from the accessory.

9. The method of claim 8 wherein communicating me one or more suggested words comprises sending a command to the accessory, the command including the one or more words.

10. An accessory comprising a controller;
a display coupled to the controller;
an interface coupled to the controller and configured to communicate with a portable computing device; and
one or more user input controls coupled to the controller, wherein the controller is configured to:
  communicate a first signal to the portable computing device via the interface, the first signal indicating selection of a text input field;
  receive an indication from the portable computing device that a text prediction feature is available for the text input field;
  send a second signal to the portable computing device, the second signal indicating selection of a first character for the text input field;
  receive one or more text suggestions from the portable computing device based on the selected character;
  display the one or more text suggestions on the display;
  receive an instruction corresponding to an action to be performed; wherein the action is determined from a plurality of actions based on a user input at the accessory, the plurality of actions comprising:
    sending a third signal to the portable computing device indicating selection of a text suggestion from the one or more text suggestions;
    sending a fourth signal to the portable computing device indicating rejection of the one or more text suggestions, and a fifth signal indicating selection of a next character, wherein the portable computing device provides the fourth signal to a text prediction engine; and
    sending a sixth signal to the portable computing device indicating selection of a second character for the text input field, without sending a signal indicating a rejection of the one or more received text suggestions.

11. The accessory of claim 10 wherein the controller is further configured to output the one or more text suggestions via an audio output device.

12. The accessory of claim 10 wherein the one or more user input controls includes a joystick.

13. The accessory of claim 10 wherein the input indicating selection of a text suggestion is provided by a user of the accessory.

14. A non-transitory computer readable medium including instructions that when executed by a controller within an accessory, cause the controller to perform a method comprising:
  sending a first command to a portable computing device informing the portable computing device that the accessory is configured to accept text suggestions;
  sending a second command to the portable computing device, the second command indicating to the portable computing device selection of a text field presented by the portable computing device;
  receiving a third command from the portable computing device, the third command indicating that a text suggestion feature is available for the text field;
  sending a fourth command to the portable computing device, the fourth command indicating selection of a character for inputting into the text field;
  receiving a fifth command from the portable computing device, the fifth command including a list of one or more words provided by a text prediction engine, the one or more words determined based on the selected character and/or a sequence of characters entered prior to the selected character; and
  sending a sixth command to the portable computing device corresponding to an action performed, the action determined from a plurality of actions based on a user input at the accessory, the plurality of actions comprising:
    a selection of a word from the list of one or more words;
    a selection of another character for inputting into the text field without a rejection of the list of one or more words; and
    a rejection of the list of one or more words and a selection of a next character, wherein the portable computing device provides the rejection of the list of one or more words to the text prediction engine.

15. The computer readable medium of claim 14 wherein the method further comprises displaying me list of one or more words.

16. The computer readable medium of claim 14 wherein the method further comprises subsequently to receiving the fifth command, changing mode of operation of the accessory to only allow selection of a word from the list of one or more words.

17. The computer readable medium of claim 14 wherein prior to sending the sixth command, receiving an input indicative of selection of a word from the list of one or more words.

18. A portable computing device comprising:
a processor:
a memory coupled to the processor; and
an accessory interface configured to communicate with an accessory, wherein the processor in cooperation with the accessory interface is configured to:
  receive a first input from the accessory indicative of selection of a text input field;
  send a notification to the accessory indicating that a text prediction feature is available for the text input field;
  receive a second input from the accessory indicating selection of a character;

provide the second input to a text prediction engine;
determine one or more words based at least in part on the character;
communicate the one or more words to the accessory;
receive a third input from the accessory corresponding to an action, the action determined from a plurality of actions based on user input at the accessory, the plurality of actions comprising:
 selection of a word from the one or more words, and in response, population of the text input field with the selected word;
 rejection of the one or more words and selection of a next character, wherein the portable computing device provides the rejection to the text prediction engine; and
 selection of another character without rejection of the one or more words.

19. The portable computing device of claim 18 wherein the processor is further configured to receive a message from the accessory indicating that the accessory is enabled to receive text suggestions.

20. The portable computing device of claim 18 wherein the processor is further configured to receive the second input via a speech recognition module coupled to the portable computing device.

21. The portable computing device of claim 18 wherein the processor is further configured to analyze one or more characters entered prior to the selected character to determine a context and determine the one or more words based on the context.

* * * * *